(12) United States Patent
Krone et al.

(10) Patent No.: US 11,838,593 B2
(45) Date of Patent: Dec. 5, 2023

(54) MULTI-MODE SELECTABLE MEDIA PLAYBACK

(71) Applicant: Disney Enterprises, Inc., Burbank, CA (US)

(72) Inventors: Matthew Krone, Weehawken, NJ (US); Matthew Jankowski, Canonsburg, PA (US); Rishi Bandopadhay, Brooklyn, NY (US); David Kesler, New York, NY (US); Jared Wolinsky, New York, NY (US); Kevin Fuhrman, New York, NY (US); Stephen Horbelt, Philadelphia, PA (US)

(73) Assignee: Disney Enterprises, Inc., Burbank, CA (US)

(*) Notice: Subject to any disclaimer, the term of this patent is extended or adjusted under 35 U.S.C. 154(b) by 318 days.

(21) Appl. No.: 16/999,654

(22) Filed: Aug. 21, 2020

(65) Prior Publication Data

US 2022/0060795 A1    Feb. 24, 2022

(51) Int. Cl.
*H04N 21/472* (2011.01)
*H04N 21/45* (2011.01)
*H04N 21/8352* (2011.01)
*H04N 21/845* (2011.01)
*H04N 21/81* (2011.01)

(52) U.S. Cl.
CPC ... *H04N 21/47217* (2013.01); *H04N 21/4532* (2013.01); *H04N 21/8106* (2013.01); *H04N 21/8352* (2013.01); *H04N 21/8456* (2013.01)

(58) Field of Classification Search
None
See application file for complete search history.

(56) References Cited

U.S. PATENT DOCUMENTS

2020/0106831 A1*  4/2020  Broberg .............. H04L 67/10
2020/0252663 A1*  8/2020  Giladi ............ H04N 21/26258
2020/0275156 A1*  8/2020  He .................. H04N 21/42201

* cited by examiner

*Primary Examiner* — Heather R Jones
(74) *Attorney, Agent, or Firm* — Farjami & Farjami LLP (57) ABSTRACT

A system includes a computing platform having a hardware processor and a memory storing a software code. The software code is executed to receive a content selection input identifying audio-video (AV) content from a user, and determine a user preferred playback mode for a core video component of the AV content using one or more of (x) a media consumption profile of the user, (y) a playback mode selection input received from the user, or (z) a playback mode supported by a user device. The software code also obtains a media package containing multiple versions of the core video component and metadata identifying a default playback mode, and streams the AV content to the user device using: the user preferred playback mode when a version of the core video component corresponding to the user preferred playback mode is contained in the media package, or the default playback mode otherwise.

20 Claims, 5 Drawing Sheets

MULTI-MODE SELECTABLE MEDIA PLAYBACK

BACKGROUND

Audio-video (AV) content has for decades been, and continues to be, one of the world's most popular mediums for the consumption of entertainment content. As the technology used to produce and display AV content has changed, so have the playback modes in which that content is presented to viewers. For instance, black-and-white video gave way to color, standard definition video has largely been replaced by high-definition (HD) and ultra-high-definition (UHD), and the aspect ratio used to render most AV content has largely migrated from 4:3 to 16:9, to name a few examples.

With respect to aspect ratio, at present the majority of consumer displays, for example televisions and mobile devices, use a 16:9 HD aspect ratio when rendering video content. As a result, the process of making historical content available on a modern streaming platform may entail remastering that content to the 16:9 aspect ratio in order to enable a full screen viewing experience. For content originating in an aspect ratio other than 16:9, such as the 4:3 aspect ratio, the remastering process re-frames the content. During re-framing, portions of the original video frames may be cropped out. For example, when re-framing content originally created in a 4:3 aspect ratio the top and bottom sections of the frame will typically be cropped out. However, in some instances, removing those portions of the video can undesirably alter the visual effectiveness of some frames, as well as undermine the creative intent of the story line, thereby diminishing the viewing experience of a subscriber to the streaming service.

SUMMARY

There are provided systems and methods for enabling multi-mode selectable media playback, substantially as shown in and described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for enabling multi-mode selectable media playback that address and overcome the drawbacks and deficiencies in the conventional art. The present audio-video (AV) content delivery solution advances the state-of-the-art by enabling a user to select among different formatted versions of the same core video component of AV content to be played back with one or more media assets shared by each different version of the video. The present application discloses a novel and inventive media package containing the multiple versions of the core video component and media assets, such as one or more audio tracks (hereinafter "audio track(s)"), descriptive metadata, subtitles, and artwork, one or more of which may be shared by the different version of the core video component. As a result, a user may advantageously select to consume AV content in black-and-white or in color, in standard definition (SD), high definition (HD), or ultra-high-definition (UHD), or AV content including video rendered in a variety of aspect ratios, using media assets contained in a single media package.

In addition, because media assets such as audio track(s), subtitles, metadata, and artwork may be shareable among multiple versions of the same core video component of AV content that are packaged together, the entire suite of AV experiences enabled by the same media package may share the same unique media identifier, such as the same Entertainment Identifier Registry identification (EIDR ID). As a result, the present AV content delivery solution streamlines and simplifies analytics tracking the content consumption and viewing habits of users, thereby making it possible for providers of AV content to be more responsive to user preferences.

In some implementations, the systems and methods disclosed by the present application may be substantially or fully automated. It is noted that, as used in the present application, the terms "automation," "automated," and "automating" refer to systems and processes that do not require the participation of a human system administrator. Although, in some implementations, a human system administrator may review the performance of the automated systems operating according to the automated methods described herein, that human involvement is optional. Thus, in some implementations, the methods described in the present application may be performed under the control of hardware processing components of the disclosed automated systems.

It is further noted that, as used in the present application, the term "core video component" refers to a video sequence including the entire video portion of a unit of AV content. Consequently, for example, where the unit of AV content takes the form of a feature film, the core video component of that AV content includes the entire video portion of the film. Analogously, where the unit of AV content takes the form of a television (TV) episode, the core video component of that AV content includes the entire video portion of the episode. In some implementations, a core video component may include interstitial content and advertising content, while in other implementations, one or both of such interstitial content and advertising content may be omitted from the core video component. Examples of interstitial content may include promotional content for the unit of AV content, promotions for other AV content, and diversions such as quizzes and games related to the unit of AV content, to name a few.

It is also noted that at least one of the different versions of the same core video component stored in a single media package differ from the other versions based on one or more unique video characteristics. Examples of unique video characteristics that may differ among different core video components include display format, pixel density or display resolution, i.e. SD versus HD versus UHD, and dynamic range, i.e. light and dark contrast range or luminance, to name a few. Moreover, specific examples of the various display formats that may serve as the unique video characteristic differentiating among different core video components may include aspect ratio, coloration, i.e. black-and-white versus color video frames, two-dimensional (2D) versus three-dimensional (3D) video, immersiveness, e.g., virtual reality (VR) video, and proprietary display formats, such as IMAX®, for instance.

Moreover, as defined for the purposes of the present application, the expression "playback mode" refers to presentation settings of a media player that correspond to the unique video characteristic of the version of the core video component being played out by the media player. Thus, a playback mode corresponding to a core video component characterized by a 4:3 aspect ratio would include media player settings to support display of the video having that aspect ratio, while a playback mode corresponding to a UHD core video component would include media player settings to support display of video in UHD, and so forth.

It is noted that in many implementations, each version of the core video component contained in the same media package will share the same timecode and the same audio track(s). However, in some implementations, one or more of the versions of the core video component may be longer or shorter than other versions contained in the same media package, and may utilize different audio track(s).

Figure 1:
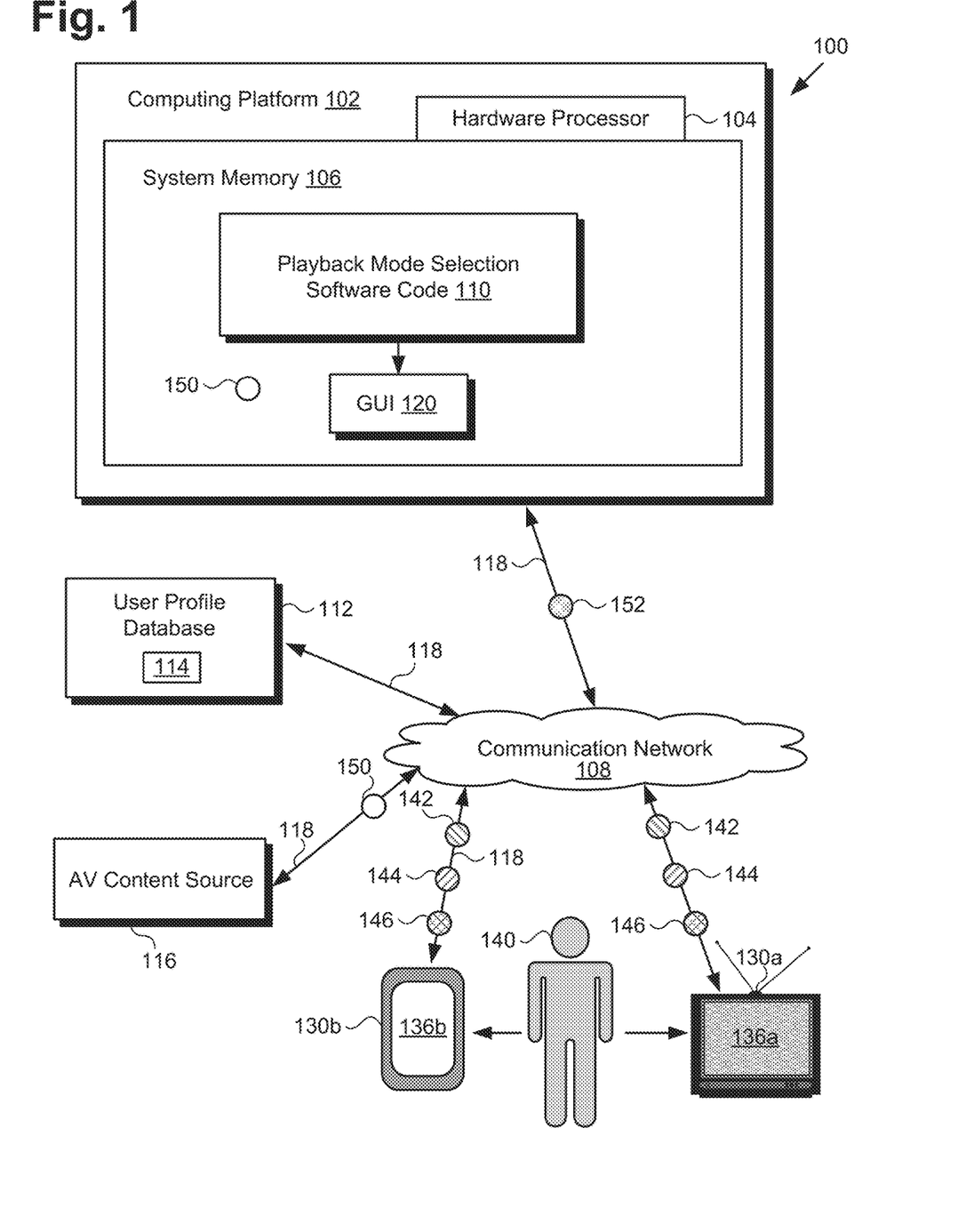
FIG. 1 shows an exemplary system for enabling multi-mode selectable media playback, according to one implementation.

FIG. 1 shows an exemplary system for enabling multi-mode selectable media playback, according to one implementation. As shown in FIG. 1, system 100 includes computing platform 102 having hardware processor 104 and system memory 106 implemented as a non-transitory storage device. According to the present exemplary implementation, system memory 106 stores playback mode selection software code 110 providing graphical user interface (GUI) 120. Moreover, FIG. 1 shows user 140 utilizing one of user device 130a including display 136a or user device 130b including display 136b to interact with system 100.

As further shown in FIG. 1, system 100 is implemented within a use environment including communication network 108, user profile database 112 storing media consumption profile 114 of user 140, and AV content source 116. In addition, FIG. 1 shows login input 142, content selection input 144, and playback mode selection input 146, as well as media package 150 and AV content 152 streamed to user device 130a or 130b and including a subset of the media assets contained in media package 150 (AV content 152 hereinafter referred to as "streamed AV content 152"). Also shown in FIG. 1 are network communication links 118 of communication network 108 interactively connecting system 100 with user profile database 112, AV content source 116, and user devices 130a and 130b.

Media package 150 may be stored in system memory 106, and may be used by playback mode selection software code 110 to provide streamed AV content 152 to user 140 via GUI 120. Although the present application refers to playback mode selection software code 110 and media package 150 as being stored in system memory 106, more generally, system memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

Moreover, although FIG. 1 depicts system 100 as including single computing platform 102, that exemplary representation is provided merely as an aid to conceptual clarity. More generally, system 100 may include one or more computing platforms 102, such as computer servers for example, which may be co-located, or may form an interactively linked but distributed system, such as a cloud-based system, for instance. As a result, hardware processor 104 and system memory 106 may correspond to distributed processor and memory resources within system 100. In one such implementation, computing platform 102 may correspond to one or more web servers accessible over a packet-switched network such as the Internet, for example. Alternatively, computing platform 102 may correspond to one or more computer servers supporting a wide area network (WAN), a local area network (LAN), or included in another type of private or limited distribution network.

Although user devices 130a and 130b are shown as a smart TV and tablet computer, respectively, in FIG. 1, those representations are also provided merely as an example. More generally, user devices 130a and 130b may be any suitable mobile or stationary computing devices or systems that implement data processing capabilities sufficient to enable use of GUI 120, support connections to communication network 108, and implement the functionality ascribed to user devices 130a and 130b herein. For example, in other implementations, user devices 130a and 130b may take the form of desktop computers, laptop computers, or smartphones, for example.

Displays 136a and 136b of respective user devices 130a and 130b may take the form of liquid crystal displays (LCDs), light-emitting diode (LED) displays, organic light-emitting diode (OLED) displays, quantum dot (QD) displays, or displays using any other suitable display technology that performs a physical transformation of signals to light. It is noted that, in some implementations, displays 136a and 136b may be integrated with respective user devices 130a and 130b, such as when user devices 130a and 130b take the form of laptop or tablet computers for example. However, in other implementations, for example where user devices 130a and 130b take the form of a computer tower in combination with a desktop monitor, displays 136a and 136b may be communicatively coupled to, but not physically integrated with respective user devices 130a and 130b.

Figure 2:
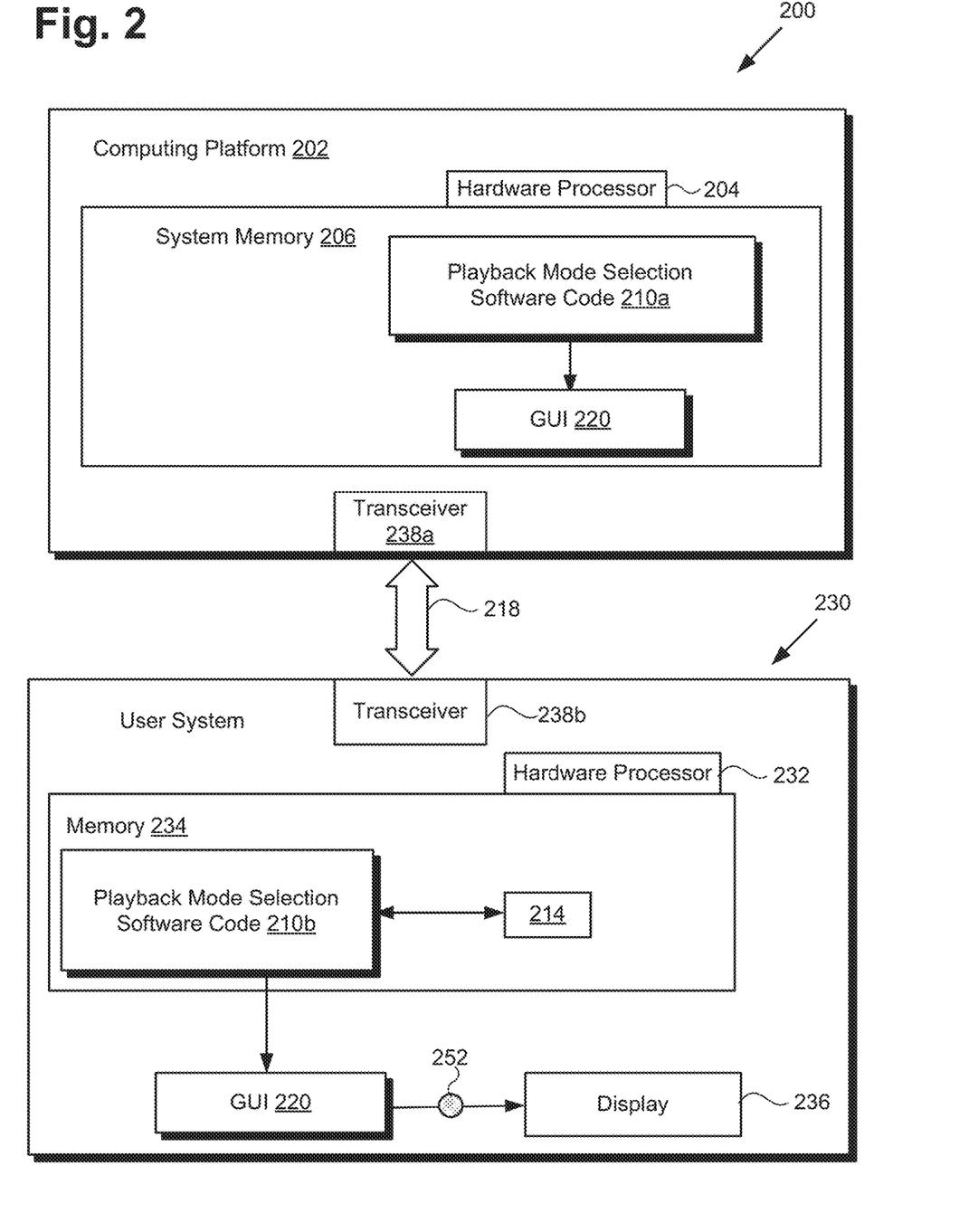
FIG. 2 shows a diagram including a more detailed exemplary representation of a user device communicatively coupled to the system shown in FIG. 1, according to one implementation.

FIG. 2 shows a more detailed representation of exemplary user device 230 in combination with computing platform 202 of system 200, according to one implementation. As shown in FIG. 2, user device 230 is communicatively coupled to computing platform 202 by network communication link 218. Computing platform 202 includes hardware processor 204, transceiver 238a, and system memory 206 implemented as a non-transitory storage device. As further shown in FIG. 2, system memory 206 contains playback mode selection software code 210a providing GUI 220.

User device 230 includes hardware processor 232 and memory 234 implemented as a non-transitory storage device storing playback mode selection software code 210b providing GUI 220, and may store media consumption profile 214 of user 140 in FIG. 1. As also shown in FIG. 2, user device 230 further includes transceiver 238b and display 236 for playing back streamed AV content 252 via GUI 220.

Network communication link 218, and system 200 including computing platform 202 having hardware processor 204 and system memory 206, correspond respectively in general to network communication link 118, and system 100 including computing platform 102 having hardware processor 104 and system memory 106, in FIG. 1. Thus, network communication link 218, and system 200 including computing platform 202, hardware processor 204, and system memory 206 may share any of the characteristics attributed to respective network communication link 118, and system 100 including computing platform 102, hardware processor 104, and system memory 106 by the present disclosure, and vice versa. As a result, like system 200, system 100 may include a feature corresponding to transceiver 238a.

In addition, playback mode selection software code 210a providing GUI 220 corresponds in general to playback mode selection software code 110 providing GUI 120, in FIG. 1. Consequently, playback mode selection software code 110 and GUI 120 may share any of the characteristics attributed to respective playback mode selection software code 210a and GUI 220 by the present disclosure, and vice versa.

Streamed AV content 252, media consumption profile 214 of user 140, and user device 230 having display 236 correspond respectively in general to streamed AV content 152, media consumption profile 114, and either or both of user devices 130a and 130b having respective displays 136a and 136b, in FIG. 1, and those corresponding features may share any of the characteristics attributed to either corresponding feature by the present disclosure. Thus, like user device 230, user devices 130a and 130b may include features corresponding to hardware processor 232, transceiver 238b, and memory 234 storing playback mode selection software code 210b and media consumption profile 214 of user 140. In addition, like displays 136a and 136b, display 236 may take the form of an LCD, LED display, OLED display, QD display, or a display using any other suitable display technology that performs a physical transformation of signals to light. Moreover, like user devices 130a and 130b, user device 230 may take a variety of forms, such as a smart TV, a smartphone, or a desktop, laptop, or tablet computer, for example.

Transceivers 238a and 238b may be implemented as wireless communication hardware and software enabling user device 130a/130b/230 to exchange data with computing platform 102/202 via network communication link 118/218. For example, transceivers 238a and 238b may be implemented as fourth generation of broadband cellular technology (4G) wireless transceivers, or as 5G wireless transceivers configured to satisfy the IMT-2020 requirements established by the International Telecommunication Union (ITU).

With respect to playback mode selection software code 210b, it is noted that in some implementations, playback mode selection software code 210b may be a thin client application of playback mode selection software code 110/210a. In those implementations, playback mode selection software code 210b may enable user device 130a/130b/230 to provide login input 142, content selection input 144, and playback mode selection input 146, shown in FIG. 1, to computing platform 102/202 for processing, and to receive streamed AV content 152/252 for rendering on display 136a/136b/236 via GUI 120/220.

Figure 3A:
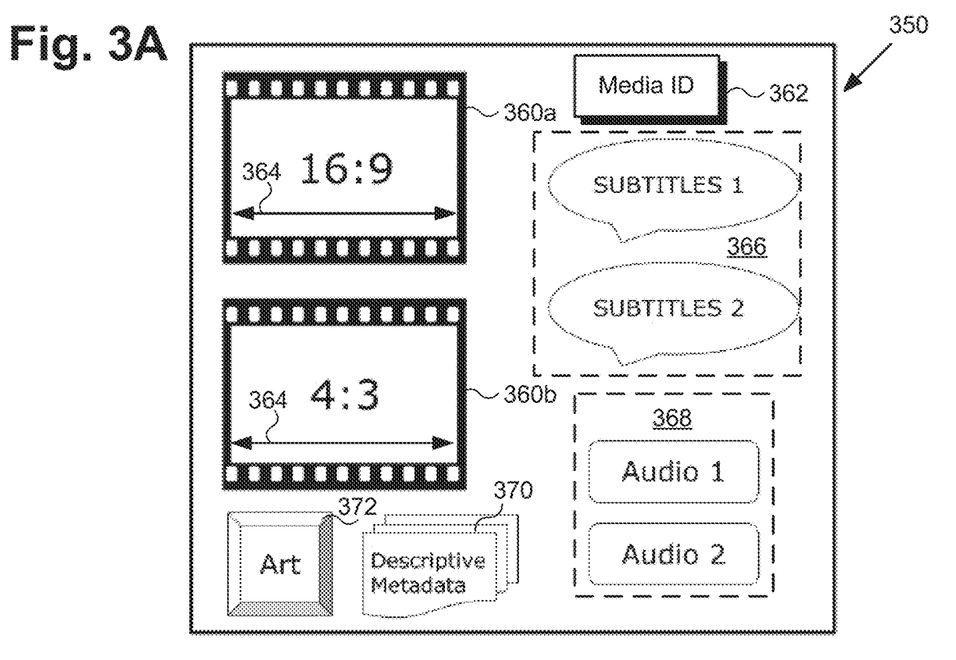
FIG. 3A shows an exemplary media package suitable for use in enabling multi-mode selectable media playback, according to one implementation.
Figure 3B:
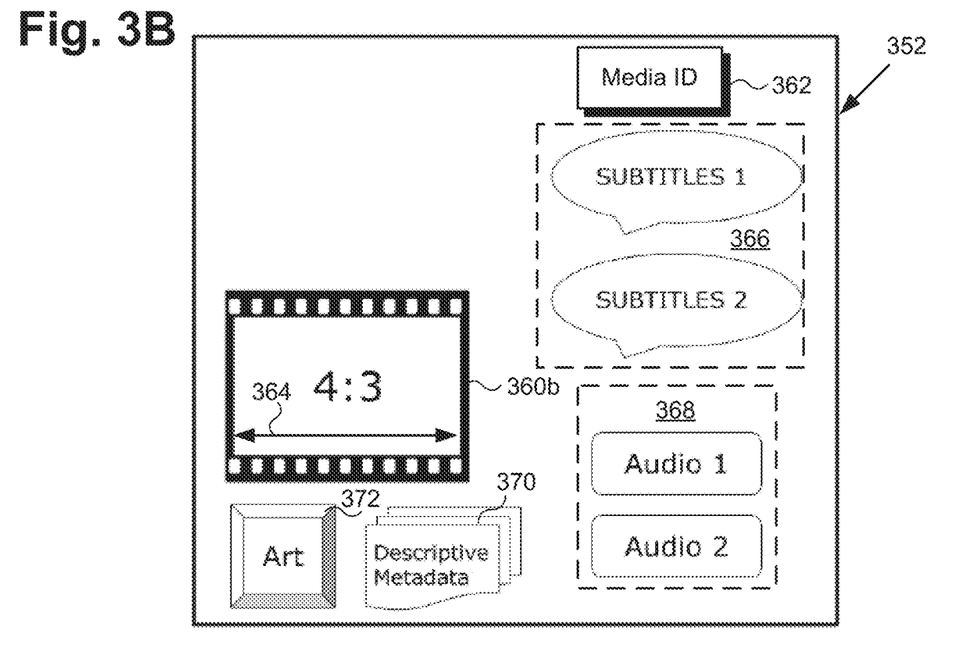
FIG. 3B shows an exemplary streamed audio-video content including a subset of the media, assets contained in the exemplary media package shown in FIG. 3A, according to one implementation.

FIG. 3A shows exemplary media package 350 suitable for use in enabling multi-mode selectable media playback, according to one implementation, while FIG. 3B shows exemplary streamed AV content 352 including a subset of the media assets contained in media package 350 in FIG. 3A, according to one implementation. As shown in FIGS. 3A and 3B, media package 350 includes multiple versions 360a and 360b of a core video component of AV content identified by a media identifier, i.e., core video component 360a and core video component 360b both identified by same media ID 362. In addition, media package 350 includes multiple media assets including one or more sets of subtitles 366 (hereinafter "subtitle(s) 366"), one or more audio tracks 368 (hereinafter "audio track(s) 368"), descriptive metadata 370, and artwork 372 related to versions 360a and 360b of the core video component. Also shown in FIGS. 3A and 3B is timecode 364 common to versions 360a and 360b of the core video component.

Versions 360a and 360b of the core video component of the AV content identified by media ID 362 differ from one another by each having at least one unique video characteristic relative to the other. According to the exemplary implementation shown in FIG. 3A, the unique video characteristic distinguishing versions 360a and 360b of the core video component from one another is their respective aspect ratio. However, in other implementations, the unique video characteristic distinguishing versions 360a and 360b from one another may be different, such as their respective coloration, pixel density, or dynamic range, for example. It is noted that although two versions 360a and 360b of the core video component are shown in FIG. 3A in the interests of conceptual clarity, in other implementations, media package 350 may include more than two versions of the core video component. It is further noted that, in some implementations, versions 360a and 360b of the core video component may differ based on more than one video characteristic.

According to the exemplary implementation shown in FIGS. 3A and 3B, because the only difference between versions 360a and 360b of the core video component is their respective aspect ratio, timecode 364, subtitle(s) 366, audio track(s) 368, descriptive metadata 370, and artwork 372 may be shared by versions 360a and 360b. That is to say, a single instantiation of each of timecode 364, subtitle(s) 366, audio track(s) 368, descriptive metadata 370, and artwork 372 may be advantageously used for playback of all versions of the core video component contained in media package 350.

In other implementations some, but not all of timecode 364, subtitle(s) 366, audio track(s) 368, descriptive metadata 370, and artwork 372 may be shared by versions 360a and 360b of the core video component. For example, where versions 360a and 360b differ based on their respective coloration, timecode 364, subtitle(s) 366, audio track(s) 368, and descriptive metadata 370 may be shared, but not artwork 372. Alternatively, in implementations in which versions 360a and 360b differ based on their respective pixel density or dynamic range, timecode 364, audio track(s) 368, and descriptive metadata 370 may be shared, but not subtitle(s) 366 or artwork 372. Nevertheless, in all implementations, each version of the core video component contained in media package 350 advantageously shares same media ID 362, which may be an EIDR ID for example.

Streamed AV content 352 includes one of the multiple versions of the core video component contained in media package 350, as well as other media assets to enhance playback of the one version of the core video component. For example, in the implementation shown by FIGS. 3A and 3B, streamed AV content 352 includes version 360b of the core video component but not version 360a. Moreover, because according to the present implementation, all of timecode 364, subtitle(s) 366, audio track(s) 368, descriptive metadata 370, and artwork 372 are shared by version 360b of the core video component, those media assets are also included in streamed AV content 352.

Media package 350 corresponds in general to media package 150 in FIG. 1. Consequently, media package 150 may share any of the characteristics attributed to corresponding media package 350 by the present disclosure, and vice versa. Thus, like media package 350, media package 150 may contain multiple versions 360a and 360b of the core video component sharing media ID 362 and timecode 364, as well as shareable media assets including subtitle(s) 366, audio track(s) 368, descriptive metadata 370, and artwork 372, Streamed AV content 352 corresponds in general to streamed AV content 152/252 in FIGS. 1 and 2. Consequently, streamed AV content 152/252 may share any of the characteristics attributed to streamed AV content 352 by the present disclosure, and vice versa.

Figure 4:
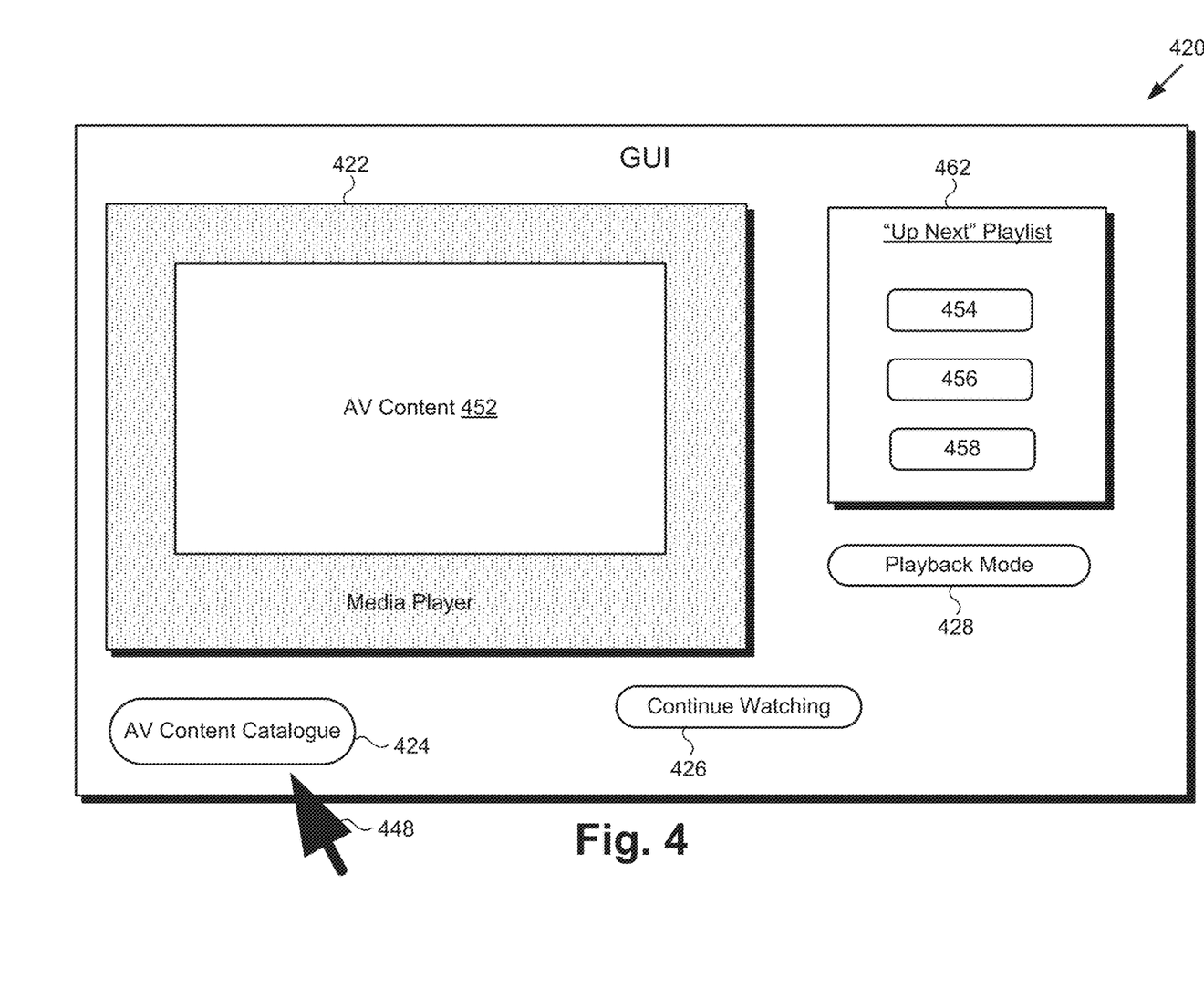
FIG. 4 shows a more detailed exemplary representation of a graphical user interface (GUI) provided by the software code of the system shown in FIG. 1, according to one implementation.

FIG. 4 shows exemplary GUI 420 provided by playback mode selection software code 110/210a of system 100/200 or by playback mode selection software code 210b of user device 130a/130b/230, according to one implementation. As shown in FIG. 4 exemplary GUI 420 includes media player 422 playing back streamed AV content 452. In addition to media player 422, GUI 420 further includes AV content catalogue 424, "continue watching" selector 426, "playback mode" selector 428, "up next" playlist 462 listing AV content items 454, 456, and 458, and input object 448 (shown as an exemplary cursor in FIG. 4) usable by user 140, in FIG. 1, to interact with GUI 220.

GUI 420 corresponds in general to GUI 120/220, in FIGS. 1 and 2. That is to say, GUI 120/220 may share any of the characteristics attributed to GUI 420 by the present disclosure, and vice versa. Thus, although not shown in FIGS. 1 and 2, GUI 120/220 may include media player 422, AV content catalogue 424, "continue watching" selector 426, "playback mode" selector 428, "up next" playlist 462, and input object 448. Moreover, streamed AV content 452 corresponds in general to streamed AV content 152/252/352 in FIGS. 1, 2, and 3B. Consequently, streamed AV content 452 may share any of the characteristics attributed to corresponding streamed AV content 152/242/352 by the present disclosure, and vice versa. In other words, like streamed AV content 352, streamed AV content 452 may include features corresponding to core video component 360b and shared media assets including timecode 364, subtitle(s) 366, audio track(s) 368, descriptive metadata 370, and artwork 372.

Figure 5:
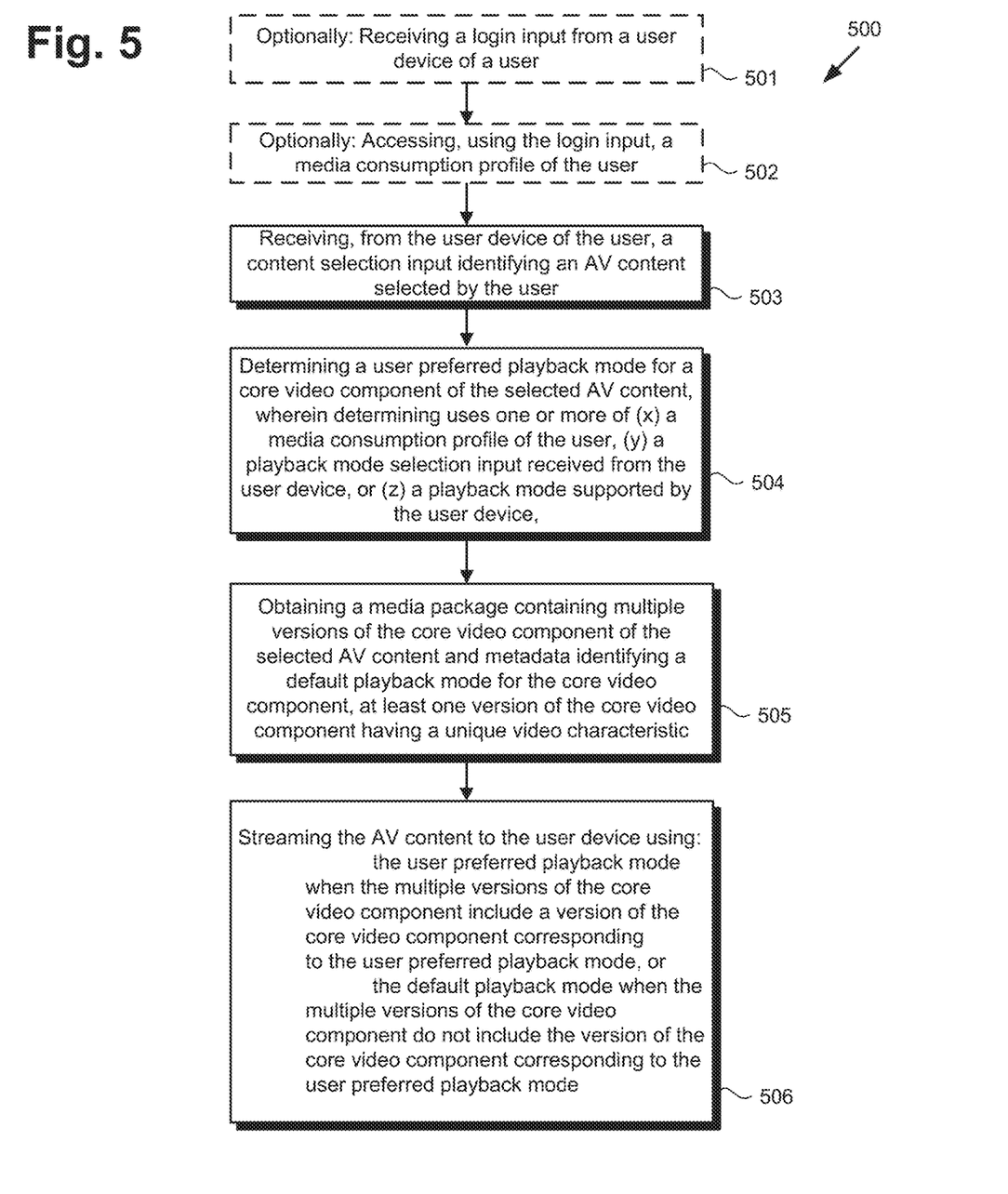
FIG. 5 shows a flowchart presenting an exemplary method for enabling multi-mode selectable media playback, according to one implementation.

The functionality of playback mode selection software code 110/210a in FIGS. 1 and 2 will be further described by reference to FIG. 5. FIG. 5 shows flowchart 500 presenting an exemplary method for enabling multi-mode selectable media playback, according to one implementation. With respect to the method outlined by FIG. 5, it is noted that certain details and features have been left out of flowchart 500 in order not to obscure the discussion of the inventive aspects disclosed in the present application. It is further noted that actions 501 and 502 of flowchart 500 are described in FIG. 5 as "optional" because in some use cases, user 140 may already have logged in to his or her account with system 100/200, and media consumption profile of user 140 may already have been accessed in response to that login. Consequently, in some implementations, the method outlined in FIG. 5 may begin with action 503 rather than action 501.

Nevertheless, referring to FIG. 5 in combination with FIGS. 1 and 2, in some implementations, flowchart 500 can begin with receiving login input 142 from user device 130a/130b/230 of user 140 (action 501). For example, where user 140 is a subscriber to a content streaming service, user 140 would typically have established a user account and login credentials for accessing that account. Action 501 corresponds to submission of login input 142 including those login credentials uniquely identifying user 140 to system 100/200. As shown by FIG. 1, in one implementation, login input 142 may be received from user device 130a/130b/230 of user 140 by system 100 via communication network 108 and network communication links 118. In those implementations, login input 142 may be received by playback mode selection software code 110/210a, executed by hardware processor 104 of computing platform 102.

Continuing to refer to FIGS. 1, 2, and 5, in some implementations, flowchart 500 can continue with accessing, using login input 142, media consumption profile 114/214 of user 140 (action 502). By way of example, playback mode selection software code 110/210a may use information included in login input 142 to access media consumption profile 114/214 of user 140, which may be stored in user profile database 112, or in memory 234 of user device 130a/130b/230. Media consumption profile 114/214 of user 140 may include an AV content consumption history of user 140, user devices 130a/130b/230 utilized by user 140 to consume AV content, playback modes preferred by user 140 for playback of AV content, and playback modes for playback of AV content that are supported by each of user devices 130a/130b/230. Action 502 may be performed by playback mode selection software code 110/210a, executed by hardware processor 104 of computing platform 102.

In various implementations, flowchart 500 can commence or con action 503, in which content selection input 144 identifying an AV content selected by user 140 is received from user device 130a/130b/230. Content selection input 144 may identify the AV content selected by user 140 by title, by media ID 362 in FIGS. 3A and 3B, or by both the title and media ID 362, for example. For instance user 140 may supply content selection input 144 to system 100/200 via GUI 120/220/420, through use of input object 448 in combination with AV content catalogue 424, "continue watching" selector 426, or "up next" playlist 462. As shown by FIG. 1, content selection input 144 may be received from user device 130a/130b/230 of user 140 by system 100 via communication network 108 and network communication links 118. In such implementations, content selection input 144 may be received by playback mode selection software code 110/210a, executed by hardware processor 104 of computing platform 102.

Flowchart 500 continues with determining the preferred playback mode of user 140 for a core video component of the AV content, wherein determining the preferred playback mode uses one or more of media consumption profile 114/214 of user 140, playback mode selection input 146 received from user device 130a/130b/230, or a playback mode supported by user device 130a/130b/230 (action 504). The preferred playback mode determined in action 504 may specify an aspect ratio of the core video component of the AV content during playback, the coloration of that video, its pixel density or resolution, or its dynamic range, for example. As specific examples, user 140 may prefer SD black-and-white video playback with 4:3 aspect ratio for playback of streamed AV content 152/252/352/452.

In some use cases in which determination of the user preferred playback mode in action 504 is performed using media consumption profile 114/214 of user 140, that determination may be performed based on an AV content consumption history of user 140. For example, user 140 may have previously watched the AV content identified in action 503 and may have specified a user preferred playback mode for the AV content at that earlier time. Alternatively, the AV content identified in action 503 may be part of a series of episodic content that user 140 has previously watched. In those implementations, action 504 may be performed based on the user preferred playback mode for other episodes in the series. As yet another alternative, or in addition, action 504 may be performed based on a user preferred playback mode of user 140 for other AV content sharing the same genre as the AV content identified in action 503.

However, in some implementations, it may be advantageous or desirable to enable user 140 to manually determine his/her user preferred playback mode for the AV content identified in action 503. In those implementations, user 140 may utilize input object 448 and "playback mode" selector 428 of GUI 120/220/420 to provide playback mode selection input 146 from user device 130a/130b/230. Thus, in some use cases, determination of the user preferred playback mode in action 504 is performed using playback mode selection input 146 received from user device 130a/130b/230.

In implementations in which a preferred playback mode of user 140 that is identified using media consumption profile 114/214 of user 140 or using playback mode selection input 146 is supported by user device 130a/130b/230, that preference of user 140 is typically determinative. However, in some implementations, that preferred playback mode may not be supported by user device 130a/130b/230. In those implementations, action 504 may include determining a closest match between a user specified playback mode and a playback mode supported by user device 130a/130b/230.

For example, the playback capabilities of user device 130a/130b/230 may be evaluated, and those capabilities may be used to generate a prioritized list of media attributes that are used to calculate the optimal playback mode for the AV content through a process called playback selection. During playback selection, the current session of user 140 may be inspected for user playback preferences, and those user preferences take priority. Action 504 may be performed by playback mode selection software code 110/210a, executed by hardware processor 104 of computing platform 102. It is noted that although flowchart 500 lists action 504 subsequent to action 503, that representation is merely exemplary. In various implementations, action 504 may follow action 503, may precede action 503, or may be performed substantially concurrently with action 503.

Flowchart 500 continues with obtaining media package 150/350 containing multiple versions 360a and 360b of the core video component of the AV content and descriptive metadata 370 identifying a default playback mode for the core video component, wherein at least one of versions 360a and 360b of the core video component has a unique video characteristic (action 505). As shown in FIG. 1, in some implementations, media package 150/350 may be obtained by system 100 from AV content source 116, via communication network 108 and network communication links 118. Media package 150/350 may be obtained by media selection software code 110/210a, executed by hardware processor 104 of computing platform 102.

As noted above by reference to FIG. 3A, in some implementations, the unique video characteristic distinguishing versions 360a and 360b of the core video component from one another may be their respective display format, such as their respective aspect ratio, coloration, i.e. black-and-white versus color video frames, whether they include 2D or 3D video, their respective immersiveness, e.g., VR video, or their use of a proprietary display format, such as IMAX®, for example. However and as also noted above, in other implementations, the unique video characteristic distinguishing versions 360a and 360b from one another may be their respective pixel density or display resolution, i.e. SD versus HD versus UHD, or their respective dynamic range, for example. Moreover, and as further noted above by reference to FIG. 3A, in some implementations, versions 360a and 360b of the core video component may differ based on more than one video characteristic.

As also noted above, when a preferred playback mode of user 140 is determined using media consumption profile 114/214 of user 140 or using playback mode selection input 146, that preference of user 140 is typically controlling. However, in some use cases, user 140 may be a new user of system 100 without an extensive media consumption profile and may decline to select a preferred playback mode via GUI 120/220/420. Alternatively, in some use cases, the user preferred playback mode determined in action 504 may not correspond to any of versions 360a and 360b of the core video component contained in media package 150/350. In those use cases, the default playback mode identified by descriptive metadata 370 may be utilized to playback the core video component.

According to the exemplary method outlined in FIG. 5, flowchart 500 can continue and conclude with delivering streamed AV content 152/252/352/52 to user device 130a/130b/260 (action 506). Streaming of streamed AV content 152/252/352/452 to user device 130a/130b/230 in action 506 may be performed by media selection software code 120/220a, executed by hardware processor 104 of computing platform 102, and using the user preferred playback mode determined in action 504, when versions 360a and 360b of the core video component include a version of the core video content corresponding to the user preferred playback mode. Alternatively, streaming of streamed AV content 152/252/352/452 to user device 130a/130b/230 in action 506 may be performed by media selection software code 120/220a, executed by hardware processor 104 of computing platform 102, using the default playback mode identified by descriptive metadata 370, when versions 360a and 360b of the core video component do not include the version of the core video content corresponding to the user preferred playback mode.

Referring to FIGS. 1 and 4, a significant advantage of the present AV content delivery solution is that it allows user preferences to work seamlessly across different user devices 130a and 130b, thereby enabling playback-dependent functionality, e.g., AV content accessed using "continue watching" selector 426, "up next" playlist 462, or content launched from a promotional page to carry over from user device 130*a* or 130*b*. For example, AV content having playback initiated on user device 130*a* using a particular playback mode may be paused by user 140, and playback may be subsequently be resumed on user device 130*b* using the same playback mode automatically.

If user 140 has indicated a preference for a playback mode that does not correspond to a version of the core video component contained in media package 150/350, the playback selection process will fall back to the default playback mode so that logical story progression and creative intent can be maintained. User 140 may utilize "playback mode" selector 428 of GUI 120/220/420 to change his or her indicated preference as desired, across multiple sessions and multiple user devices 130*a* and 130*b*, without interrupting the progression of content presentations, e.g., at the episodic, seasonal, or series level. Moreover, in some implementations, actions 503, 504, 505, and 506 (hereinafter "actions 503-506"), or actions 501, 502, and 503-506 may be performed in an automated process from which participation of a human system administrator may be omitted.

Thus, the present application discloses systems and methods for enabling multi-mode selectable media, playback that address and overcome the drawbacks and deficiencies in the conventional art. The present AV content delivery solution advances the state-of-the-art by enabling a user to select among different versions of the same core video component of AV content to be played back with one or more media assets shared by each different version of the video. Furthermore, and as described above, the present application discloses a novel and inventive media package containing the multiple versions of the core video component and media assets, such as audio tracks, descriptive metadata, subtitles, and artwork that, in various implementations, may be shared by the different formatted versions of the core video. As a result, a user may advantageously select to consume AV content in black-and-white or in color, in SD, HD, or UHD, or AV content including video rendered in a variety of aspect ratios, using media assets contained in a single media package and collectively identified using a single unique media identifier, such as an EIDR ID.

By reusing shareable media assets such as timecodes, audio tracks, subtitles, artwork and descriptive metadata for multiple viewing experiences reduces the amount of content to manage, quality control, and cache for optimizing content delivery. A "continue watching" selector of the system provided GUI allows a user to resume viewing of AV content where she or he has left off, using the same user preferred playback mode across multiple viewing experiences of the same AV content. An "up next" playlist shown via the GUI allows the user to preview what can be watched next (e.g., the next episode of a series) and to enter the viewing experience of that "up next" title while preserving the user preferred playback mode. Use of a single media identifier to identify all formatted versions of the same core video component of the AV content advantageously facilitates a user search for content, as well as content consumption analytics by an owner of the AV content, by returning a single consolidated result for a single title, rather than multiple results for multiple versions of the same title.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
   a computing platform including a hardware processor and a system memory;
   a software code stored in the system memory;
   the hardware processor configured to execute the software code to:
      receive, from a user device of a user, a content selection input identifying an audio-video (AV) content selected by the user;
      determine a user preferred playback mode for a core video component of the AV content, wherein determining uses at least one of (x) a media consumption profile of the user, (y) a playback mode selection input received from the user device, or (z) a playback mode supported by the user device;
      obtain a media package containing a plurality of versions of the core video component of the AV content and a metadata identifying a default playback mode for the core video component, wherein at least one of the plurality of versions of the core video component has a unique video characteristic; and
      stream the AV content to the user device using:
         the user preferred playback mode, when the plurality of versions of the core video component include a version of the core video component corresponding to the user preferred playback mode, or
         the default playback mode, when the plurality of versions of the core video component do not include the version of the core video component corresponding to the user preferred playback mode.

2. The system of claim 1, wherein the hardware processor is further configured to execute the software code to:
   receive a login input from the user device of the user; and
   access, using the login input, the media consumption profile of the user.

3. The system of claim 1, wherein each of the plurality of versions of the core video component share a same media identifier.

4. The system of claim 3, wherein the same media identifier comprises an Entertainment Identifier Registry identification (EIDR ID).

5. The system of claim 1, wherein the plurality of versions of the core video component share a same timecode and a same audio track included in the media package.

6. The system of claim 1, wherein the plurality of versions of the core video component share a same descriptive metadata and a same set of subtitles included in the media package.

7. The system of claim 1, wherein the unique video characteristic of the at least one of the plurality of versions of the core video component comprises at least one of an aspect ratio, a coloration, a pixel density, or a dynamic range of the at least one version of the core video component.

8. A method for use by a system including a computing platform having a hardware processor and a system memory storing a software code, the method comprising:

receiving from a user device of a user, by the software code executed by the hardware processor, a content selection input identifying an audio-video (AV) content selected by the user;

determining, by the software code executed by the hardware processor, a user preferred playback mode for a core video component of the AV content, wherein determining uses at least one of (x) a media consumption profile of the user, (y) a playback mode selection input received from the user device, or (z) a playback mode supported by the user device;

obtaining, by the software code executed by the hardware processor, a media package containing a plurality of versions of the core video component of the AV content and a metadata identifying a default playback mode for the core video component, wherein at least one of the plurality of versions of the core video component has a unique video characteristic; and streaming, by the software code executed by the hardware processor, the AV content to the user device using:

the user preferred playback mode, when the plurality of versions of the core video component include a version of the core video component corresponding to the user preferred playback mode, or the default playback mode, when the plurality of versions of the core video component do not include the version of the core video component corresponding to the user preferred playback mode.

9. The method of claim 8, further comprising:

receiving, by the software code executed by the hardware processor, a login input from the user device of the user; and accessing, by the software code executed by the hardware processor and using the login input, the media consumption profile of the user.

10. The method of claim 8, wherein each of the plurality of versions of the core video component share a same media identifier.

11. The method of claim 10, wherein the same media identifier comprises an Entertainment Identifier Registry identification (EIDR ID).

12. The method of claim 8, wherein the plurality of versions of the core video component share a same timecode and a same audio track included in the media package.

13. The method of claim 8, wherein the plurality of versions of the core video component share a same descriptive metadata and a same set of subtitles included in the media package.

14. The method of claim 8, wherein the unique video characteristic of the at least one of the plurality of versions of the core video component comprises at least one of an aspect ratio, a coloration, a pixel density, or a dynamic range of the at least one version of the core video component.

15. A computer-readable non-transitory storage medium having a media package enabling media playback selection stored thereon, the media package comprising:

an audio-video (AV) content including a plurality of versions of a core video component, each one of the plurality of versions of the core video component having a different aspect ratio than another one of the plurality of versions of the core video component;

a metadata identifying a default playback mode of the core video component, the default playback mode corresponding to one of the plurality of versions of the core video component; and at least one media content asset shared by the plurality of versions of the core video component;

wherein the plurality of core video components share a same media identifier.

16. The computer-readable non-transitory storage medium of claim 15, wherein the same media identifier comprises an Entertainment Identifier Registry identification (EIDR ID).

17. The computer-readable non-transitory storage medium of claim 15, wherein the at least one media content asset shared by the plurality of versions of the core video component comprise a same timecode and a same audio track included in the media package.

18. The computer-readable non-transitory storage medium of claim 15, wherein the at least one media content asset shared by the plurality of versions of the core video component comprise a same descriptive metadata and a same set of subtitles included in the media package.

19. The computer-readable non-transitory storage medium of claim 15, wherein each one of the plurality of versions of the core video component has a different dynamic range than another one of the plurality of versions of the core video component.

20. The computer-readable non-transitory storage medium of claim 15, wherein each one of the plurality of versions of the core video component has a different pixel density than another one of the plurality of versions of the core video component.

* * * * *